United States Patent [19]

Nakamura

[11] Patent Number: 5,254,248
[45] Date of Patent: Oct. 19, 1993

[54] BLOOD PLASMA SEPARATING APPARATUS

[75] Inventor: Atsuo Nakamura, Fujinomiya, Japan

[73] Assignee: Terumo Kabushiki Kaisha, Tokyo, Japan

[21] Appl. No.: 721,252

[22] Filed: Jun. 26, 1991

[30] Foreign Application Priority Data

Jun. 28, 1990 [JP] Japan .................................. 2-171247

[51] Int. Cl.⁵ ............................................. B01D 61/00
[52] U.S. Cl. ........................... 210/321.67; 210/321.68; 210/321.87; 210/500.3
[58] Field of Search ...................... 210/321.63, 321.68, 210/321.87, 450, 456, 512.1, 321.67, 500.3; 604/6; 422/44, 101

[56] References Cited

U.S. PATENT DOCUMENTS

| | | | |
|---|---|---|---|
| 4,459,210 | 7/1984 | Murakami et al. | 210/500.3 |
| 4,660,462 | 4/1987 | Thompson et al. | 55/480 |
| 4,670,147 | 6/1987 | Schoendorfer et al. | 210/541 |
| 4,740,313 | 4/1988 | Schoendorfer et al. | 210/651 |
| 4,753,729 | 6/1988 | Schoendorfer et al. | 210/304 |
| 4,755,300 | 7/1988 | Fischel et al. | 210/321.68 |
| 4,790,942 | 12/1988 | Shmidt et al. | 210/321.68 |
| 4,808,307 | 2/1989 | Fischel et al. | 210/321.68 |
| 4,869,812 | 9/1989 | Schoendorfer et al. | 210/497.01 |
| 4,871,462 | 10/1989 | Fischel et al. | 210/651 |
| 4,876,013 | 10/1989 | Shmidt et al. | 210/650 |
| 4,911,847 | 3/1990 | Shmidt et al. | 210/650 |
| 5,054,209 | 10/1991 | Koff | 210/360.1 |

FOREIGN PATENT DOCUMENTS

| | | |
|---|---|---|
| 0231623 | 8/1987 | European Pat. Off. |
| 0310205 | 4/1989 | European Pat. Off. |
| 2812042 | 10/1979 | Fed. Rep. of Germany |
| WO85/02783 | 6/1985 | World Int. Prop. O. |
| WO87/01048 | 2/1987 | World Int. Prop. O. |

Primary Examiner—Robert A. Dawson
Assistant Examiner—Sun Uk Kim
Attorney, Agent, or Firm—Frishauf, Holtz, Goodman & Woodward

[57] ABSTRACT

A plasma separating apparatus comprising a housing provided with a blood inlet port, a plasma outlet port, and a blood cell outlet port; an rotor rotatably held in the housing; a blood separating space formed between the outside surface of the rotor and the inside surface of the housing and communicating with the blood inlet port at its upper part and with the blood cell outlet port at its lower part; a plasma passage enclosing at least a part of the circumference of the blood separating space and communicating with the plasma outlet port; and a plasma separating membrane disposed so as to partition the blood separating space and the plasma passage.

11 Claims, 7 Drawing Sheets

(Prior Art)

FIG. 7

(Prior Art)

F I G . 8

BLOOD PLASMA SEPARATING APPARATUS

BACKGROUND OF THE INVENTION

The present invention relates to a blood plasma separating apparatus, and more particularly to an apparatus for separating plasma from whole blood by a centrifugal shearing force generated by rotation.

Separation of blood elements which separates whole blood into plasma and blood cells such as red blood cells and white blood cells is conventionally conducted. Mostly centrifugal separation is employed as the method for this plasma separation, but use of membrane filtration by means of plasma separating membranes is increasing. In this membrane filtration, the filtration efficiency drops quickly because of clogging of membrane pores by blood cells, when simply flowing blood along one side of a plasma separating membrane. To prevent such blockage of the membrane filter, a plasma separation apparatus is proposed in U.S. Pat. No. 4,753,729, which has a rotor with the cylindrical side wall covered by a plasma separating membrane and a housing rotatably receiving the rotor, and flows whole blood through the space between the rotor and the housing while rotating the rotor.

Figure 7:
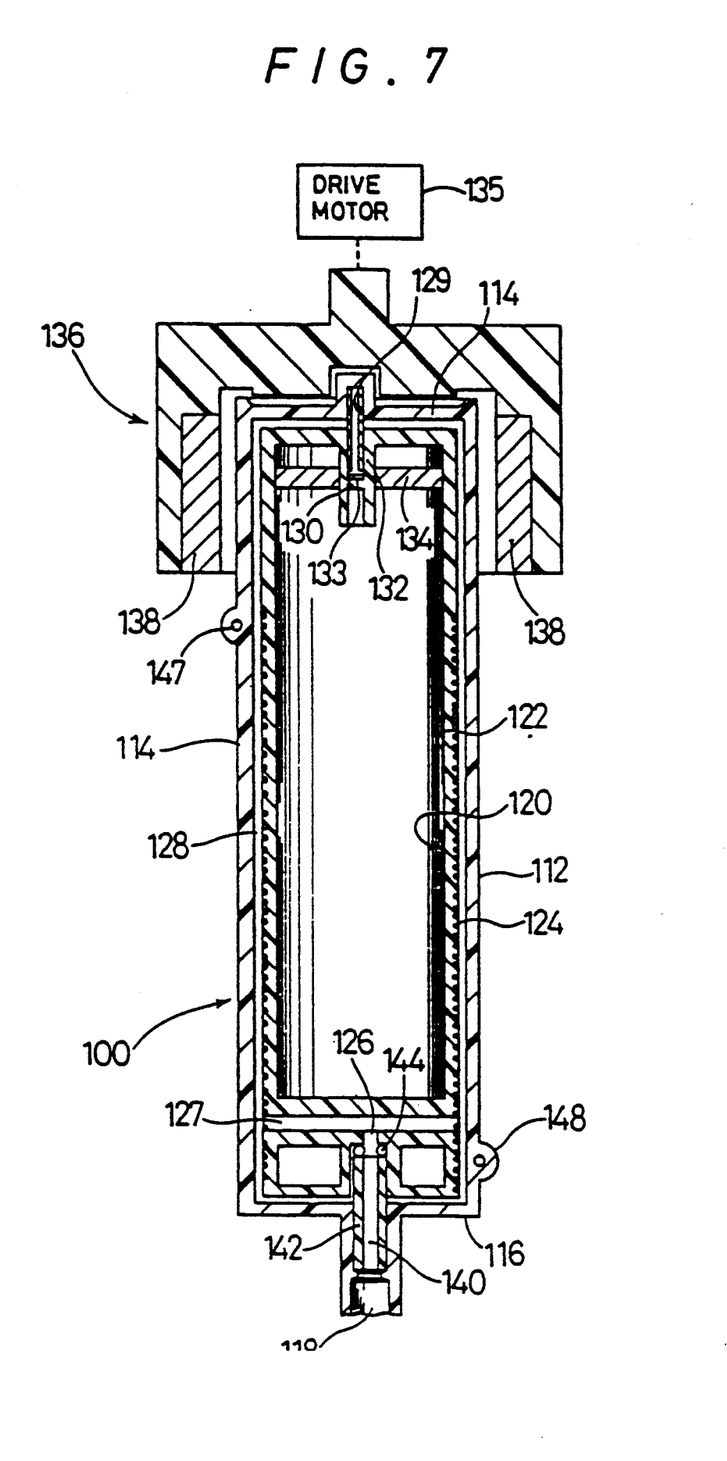
FIG. 7 is a sectional view of a conventional plasma separating apparatus.

A cross-sectional view of the above plasma separating apparatus is shown in FIG. 7. This plasma separating apparatus 100 has a cylindrical housing 112 and a rotor 120. The housing 112 comprises an upper end cap 114, a blood inlet port 147 disposed near the upper end of the housing 112, a blood outlet port 148 disposed at the bottom end of the housing 112, and the bottom end 116 provided with a plasma outlet port 118.

The rotor 120 is disposed in a vertical position between the upper end cap 114 and the bottom end 116 of the housing 112. The rotor 120 has a central mandrel part 122 and in the outer periphery of the mandrel 122 circumferential plasma channels 124 are formed. A plasma separating membrane 128 is attached to the outer surface of the rotor 120 so as to cover the plasma channels 124. The plasma channels 124 communicate with a central axis bore 126 through longitudinal grooves (not shown) intersecting them and a plasma channel 127. The central bore 126 communicates with the plasma outlet port 118. The rotor 120 rotates about an upper pivot pin 129 fitted at its upper end in the upper end cap 114.

In the prior art of FIG. 7, the rotary spinner 120 is mounted in the upper end cap 114 to rotate about an upper pivot pin 129 which is press fitted as its upper end in the end cap 114, the lower end of the pin being seated within a cylindrical bearing surface 130 in an end cylinder 132 attached to or forming an integral part of the rotary spinner 120. The lower end of the pin 129 protrudes into a small chamber 133 adjacent the bearing surface 130 so that the lower end of pin 129 does not dig into the end cylinder 132.

Figure 8:
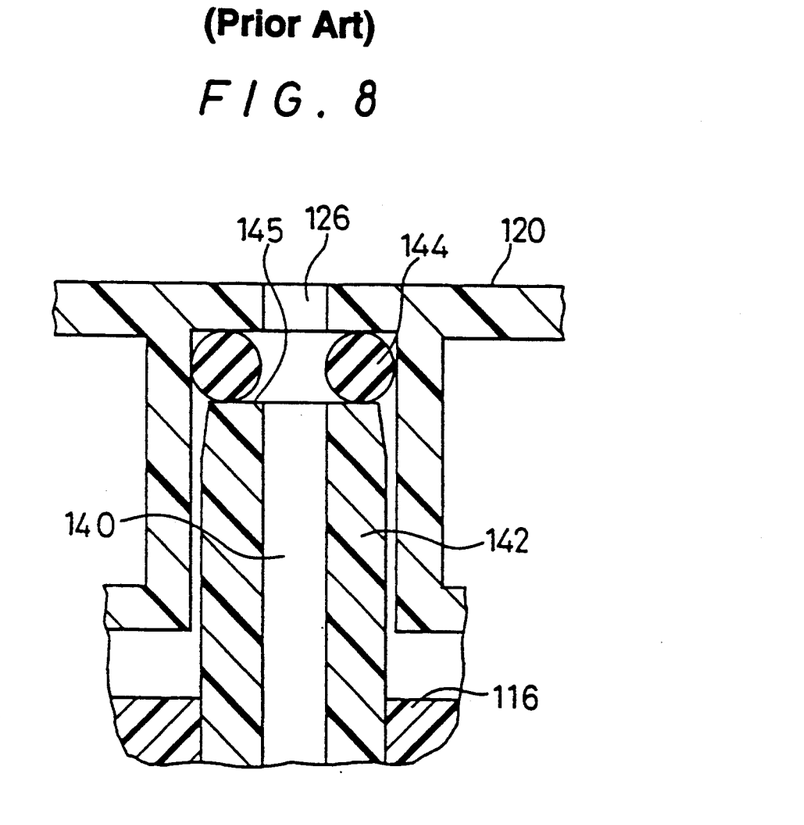
FIG. 8 is an enlarged scale sectional view of the bottom part of the plasma separating apparatus of FIG. 7.

A ferromagnetic drive element 134 is mounted on a thin cylinder 132 formed in the upper end of the rotor 120, perpendicularly to the central axis of the rotor 120. The ferromagnetic drive element 134 receives a driving force through the wall of the housing 112 for indirect driving of the rotor 122. A drive motor 135 disposed outside the housing 112 drives an annular drive member 136. The drive member 136 has four permanent magnets 138 disposed at equal spaces in the inner side wall of the drive member 136. The permanent magnets 138 induce magnetic field through the ferromagnetic rotor drive element 134. When the drive member 136 rotates, the ferromagnetic drive element 134 is driven through magnetic coupling and thereby rotates the rotor 120. An enlarged scale sectional view of the bottom part of this plasma separating apparatus is shown in FIG. 8. As shown in FIG. 8, the central bore 126 formed along the central axis of the rotor 120 communicates with a central aperture 140 in a pivot pin 142 seated concentrically in the bottom end 116 of the housing 112. An O-ring seal 144 is mounted on a bearing surface 145 of the pivot pin 142.

Constructed as described above, The plasma is filtered through the membrane 128 into the plasma channels 124 with enhanced vortex action generated by the rotation of the rotor 120, collects in the plasma channel 127 through longitudinal grooves (not shown), and then flows out from the outlet port 118 through the central aperture 140 in the pivot pin 142.

In this plasma separating apparatus 100, the plasma discharge passage is disposed in the pivot mechanism as shown in FIG. 8. Therefore, the rotor 120 must be rotatably held and at the same time the plasma discharge passage must be sealed fluid-tight by means of the bottom end of the rotor 120, the pivot pin 142, and the O-ring seal 144. However, it is very difficult to hold the rotor 120 rotatably and to seal the plasma discharge passage fluid-tight at the same time. It is especially difficult to seal fluid-tight with an O-ring seal 144 alone. For this reason, there is a problem with this plasma separating apparatus 100 that blood cells flowing between the inside wall of the bottom end 116 of the housing 112 and the bottom end of the rotor 120 can mix in the separated plasma flowing in the central aperture 140 in the pivot pin 142, passing through the space around the pivot pin 142 and leaking in the aperture 140. This apparatus is thus not satisfactory to collect pure plasma.

SUMMARY OF THE INVENTION

A object of the present invention is to provide an improved plasma separating apparatus of the type that separates plasma by rotation of a rotor held in a housing which can solve the above problem of the conventional apparatus and draw pure plasma with no risk of blood cells mixing in despite of its type.

This object is attained by the plasma separating apparatus of the present invention which comprises a housing having a blood inlet port, a plasma outlet port, a blood cell outlet Port and a plasma passage; a rotor rotatably held in the housing; a blood separating space formed between the outside surface of the rotor and the inside surface of the housing and communicating with the blood inlet port at its upper part and with the blood cell outlet port at its lower part; the plasma passage enclosed at least a part of the circumference of the blood separating space and communicates with the plasma outlet port; and a plasma separating membrane disposed so as to partition the blood separating space and the plasma passage.

DETAILED DESCRIPTION OF THE PREFERRED EMBODIMENTS

Embodiments of the plasma separating apparatus of the present invention are described below in detail with reference to the drawings.

Figure 1:
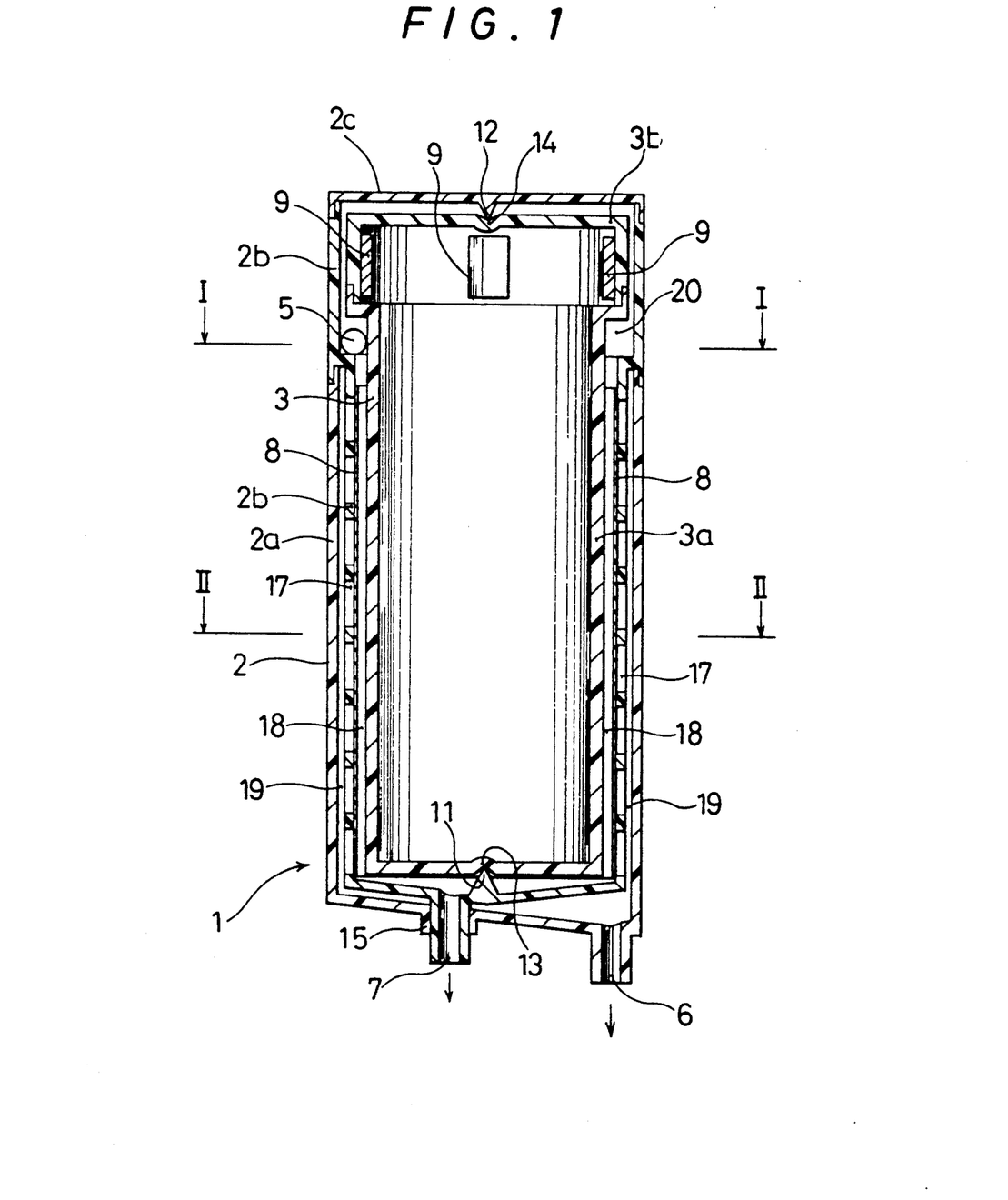
FIG. 1 is a sectional view of an embodiment of the plasma separating apparatus of the present invention.
Figure 2:
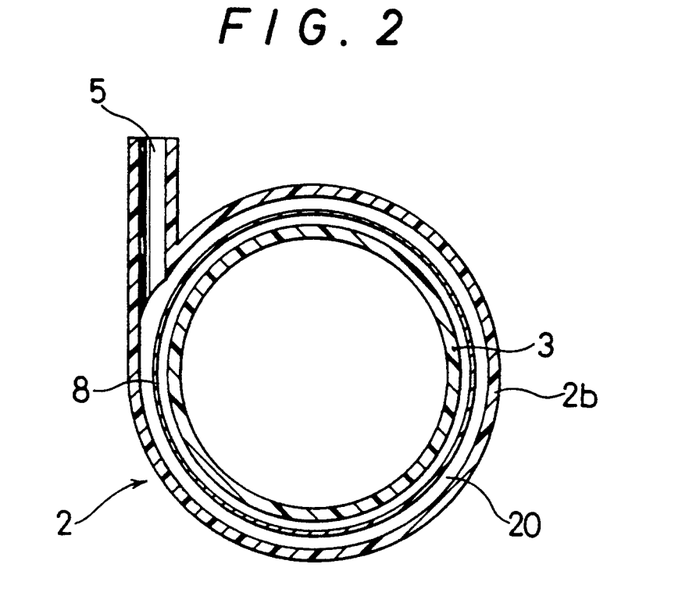
FIG. 2 is a sectional view taken along the line I—I in FIG. 1.
Figure 3:
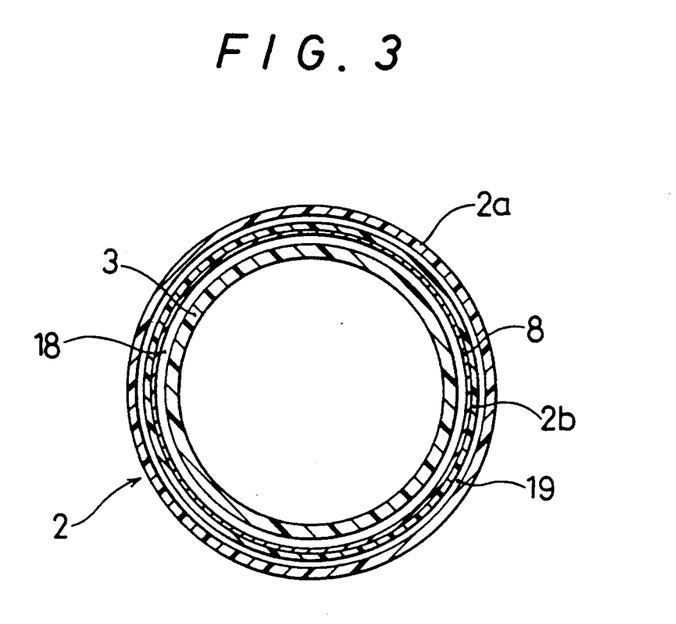
FIG. 3 is a sectional view taken along the line II—II in FIG. 1.

FIG. 1 is a sectional view of an embodiment of the plasma separating apparatus of the present invention, FIG. 2 is a sectional view taken along the line I—I in FIG. 1, and FIG. 3 is a sectional view taken along the line II—II in FIG. 1.

The plasma separating apparatus 1 of the present invention comprises a housing 2 having a blood inlet port 5, a plasma outlet port 6, a blood cell outlet port 7 and a plasma passage 19; a rotor 3 rotatably housed in the housing 2; a blood separating space 18 which is formed between the outside surface of the rotor 3 and the inside surface of the housing 2 and communicates with the blood inlet port 5 at its upper part and with the blood cell outlet port 7 at its bottom; the plasma passage 19 which encloses at least a part of the circumference of the blood separating space 18 and communicates with the plasma outlet port 6 and a plasma separating membrane filter 8 disposed in the housing 2 so as to partition the blood separating space 18 and the plasma passage 19.

Since this plasma separating apparatus 1 forces plasma to pass through the membrane 8 with a centrifugal shearing force generated by the rotation of the rotor 3 and the separated plasma flows through the plasma passage 19 to the plasma outlet port 6, the separated plasma does not flow through the rotor to the plasma outlet port 6. Therefore, the rotor need not be sealed fluid-tight from the housing. Further, the plasma discharge passage can be disposed separately from the pivot mechanism. Thus, it becomes possible to draw pure plasma with no risk of blood cells mixing in the separated plasma. In addition to this advantage, since the rotor need not be sealed fluid-tight from the housing, the rotating resistance of the rotor is considerably decreased and accordingly the rotor can be rotated at a higher speed by a smaller driving force.

Next, the specific construction of the first embodiment is described in detail referencing to FIGS. 1 to 3.

The plasma separating apparatus 1 of this embodiment has a housing 2 and a rotor or spinner 3 which is rotatably held in the housing 2. The housing 2 is provided with a blood inlet port 5, a plasma outlet port 6, and a blood cell outlet port 7. In more detail, as shown in FIG. 1 the housing 2 comprises an outside housing 2a, an inside housing 2b, and a cap 2c. As shown in FIG. 1 and FIG. 2 which is a sectional view taken along the line I—I in FIG. 1, the inside housing 2b is substantially cylindrical. The inside housing 2b has the blood inlet port 5 disposed in its upper side wall in substantially parallel with a tangential line of the side wall. The lower part of the inside housing 2b enclosed by the outside housing 2a is provided with a plurality of plasma passage openings 17. Formed at the center of the bottom end of the inside housing 2b is a projection 11 which supports the rotor 3 rotatably. The blood cell outlet port 7 is formed in the bottom end of the inside housing 2b near the projection 11. The bottom end of the inside housing 2b slopes down to the blood cell outlet port 7. Further, a plasma separating membrane 8 is attached to the inside surface of the side wall of the inside housing 2b so as to cover the plasma passage openings 17. The lower part of the inside housing 2b to where the plasma separating membrane is attached is a little smaller outer diameter than the upper part in which the blood inlet port 5 is provided.

The outside housing 2a has a substantially cylindrical shape and its upper end is attached to the inside housing 2b. The outside housing 2a encloses concentrically the lower part of the inside housing 2b with the plasma separating membrane 8 attached to. An hole 15 for inserting the blood cell outlet port 7 of the inside housing 2b is formed in the bottom end of the outside housing 2a. The plasma outlet port 6 is also formed in the bottom end of the outside housing 2a near the circumference. The bottom end of the outside housing 2a slopes down to the plasma outlet port 6. As shown in FIG. 1 and FIG. 3 which is a sectional view taken along the line II—II in FIG. 1, a plasma passage 19 is formed between the inside surface of surface of the lower part of the inside housing 2b to where the membrane 8 is attached.

The cap 2c is attached to the opening at the top end of the inside housing 2b. A projection 12 is formed at the center of the cap 2c, and the rotor 3 is held rotatably by this projection 12 and the projection 11 of the inside housing 2b. To reduce the rotating resistance when the rotor 3 is rotating and decrease wear of the tips of the projections 11 and 12 due to friction, these projections 11 and 12 may also be formed by attaching parts separately made of a metal.

The rotor 3 comprises a lower part 3a having a substantially cylindrical shape and an upper part 3b attached to the opening at the upper end of the lower part 3a. A concavity 13 for receiving the tip of the projection 11 is formed in the bottom end of the lower part 3a of the rotor 3a. A concavity 14 for receiving the tip of the projection 12 is formed in the top end of the upper part 3b of the rotor 3b. These concavities 13 and 14 prevent displacement of the rotor 3. These concavities may be formed by attaching parts separately made of a metal to reduce the rotational resistance and decrease wear of the concavities 13 and 14.

There are no holes formed in the side wall of the rotor 3 so that blood does not enter the inside of the rotor 3. Further, the blood separating space 18 is formed between the side wall of the rotor 3 and the lower part of the inside housing 2b with the plasma separating membrane 8. The space in which the blood inlet port 5 opens is wider than the above plasma separating space 18 and forms an annular space between the rotor 3 and the inside housing 2b. This annular space 20 serves as a blood inlet chamber.

The ferromagnetic elements 9 for driving the rotor 3 by receiving the magnetic field from outside the housing 2 are disposed inside the rotor 3 at the upper end. Chips made of iron, iron alloys and the like in an appropriate form can be used for the ferromagnetic elements 9, the ferromagnetic elements 9 are disposed equally spaced, and the number of the ferromagnetic elements 9 is preferably two or four for example, shown in FIG. 1. Ferromagnetic elements with magnetism may also be used. The rotor 3 rotates at about 600 to 5,000 rpm or preferably at 1,500 to 3,600 rpm, driven by the driving force transmitted to the ferromagnetic elements 9. The centrifugal shearing force generated by the rotation of the rotor 3 at the outside surface of the side wall of the rotor 3 is transmitted to the blood flowing in the plasma separating space 18 and the plasma in the blood filters through the plasma separating membrane 8 into the plasma passage 19.

The rotor 3 is preferably about 20 to 40 mm in the diameter of its lower part 3a, that is, the part serving for separating blood. The distance between the side wall of the rotor 3 and the plasma separating membrane 8 (in other words, the width of the plasma separating space 18) is preferably about 1 to 5 mm. The distance between the inside housing 2b and the outside housing 2a (in other words, the width of the plasma passage 19) is preferably about 2 to 4 mm.

For the material for forming the housing 2 and the rotor 3, any material can be used if it does not intercept magnetic field. Polycarbonate, polypropylene, styrene resin (polystyrene, MBS, MS) can be used. Transparent materials are more preferable since they allow the inside process to be watched.

For the plasma separating membrane 14, porous membranes which do not pass blood cells but pass plasma are used. Porous membranes made from cellulose ester of organic acids such as cellulose nitrate, cellulose acetate and from synthetic resins such as polypropylene, polyethylene, polycarbonate are preferable. The thickness of the plasma separating membrane is preferably about 30 to 200 μm. For plasma separating membranes made by conventional methods such as phase separation method, extraction method, drawing method, charged-particle irradiation method, membranes with average pore size of about 0.1 to about 1.0 μm are preferable, and those with average pore size of 0.1 to 0.8 μm are particularly preferable.

Figure 4:
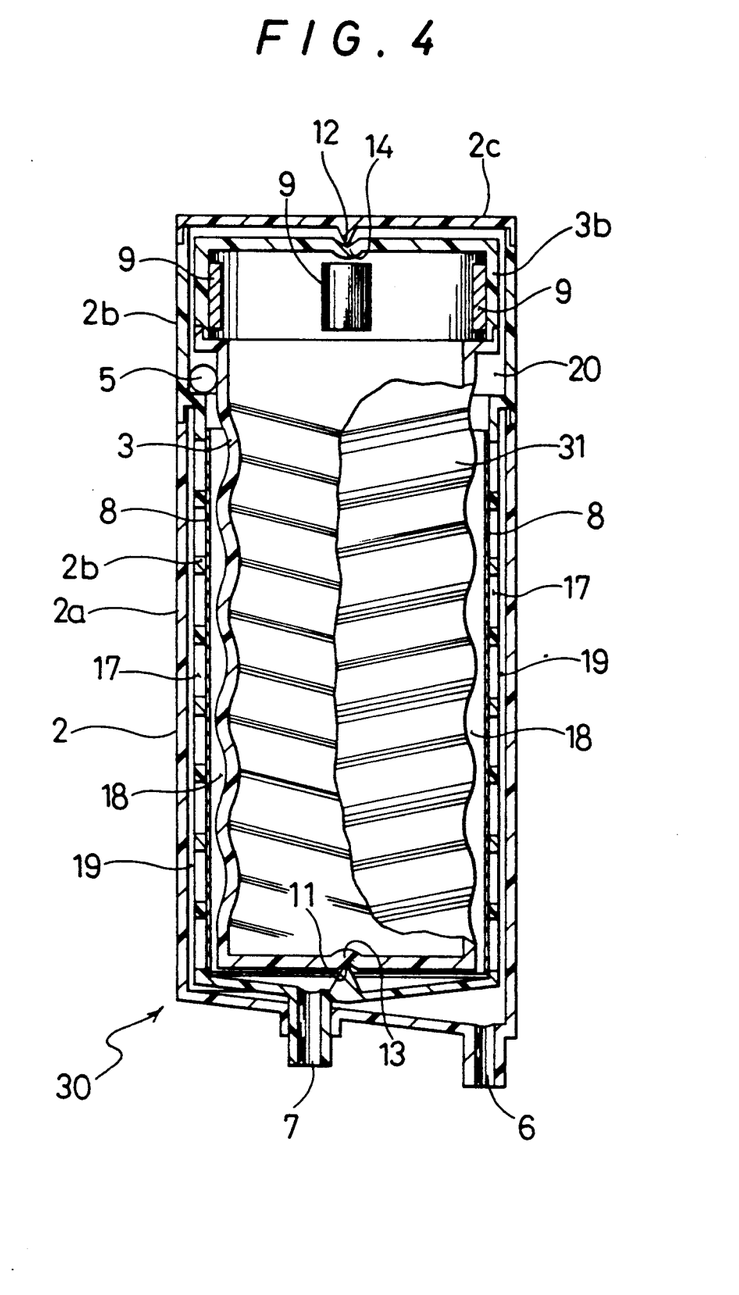
FIG. 4 is a sectional view of another embodiment of the plasma separating apparatus of the present invention.

Next, an embodiments of the plasma separating apparatus of the present invention shown in FIG. 4 is described.

The plasma separating apparatus 30 of this embodiment and that of the embodiment shown in FIG. 1 are different in the shape of the rotors 3 and are the same in the other construction.

In the plasma separating apparatus 30 of this embodiment, the rotor 3 has a continuous spiral concavity 31 formed in the outside surface of the side wall. By forming such a continuous spiral concavity 31, it becomes possible to cause turbulence in the blood stream flowing between the rotor 3 and the plasma separating membrane 8 and thereby prevent blockage of the membrane pores. The pitch of the spiral concavity 31 is preferably about 1 to about 10 mm. The shortest distance between the rotor 3 and the plasma separating membrane 8 is preferably about 1 to about 5 mm, and the longest distance is preferably 2 to 10 mm.

Figure 5:
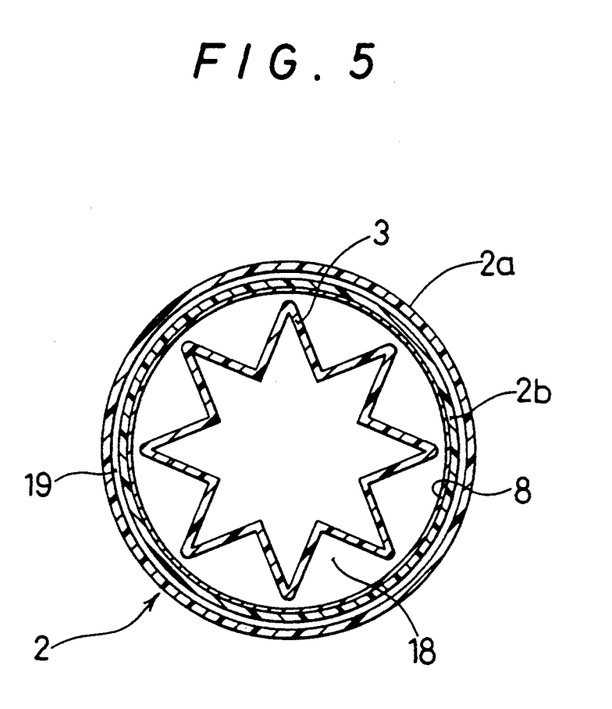
FIG. 5 is a sectional view of another embodiment of the plasma separating apparatus of the present invention.

Moreover, a rotor 3 which has grooves extending along its axis of rotation and a star-like cross section as shown in FIG. 5 may also be used.

Next, the operation of the plasma separating apparatus of this invention is described using the embodiment shown in FIG. 1.

Figure 6:
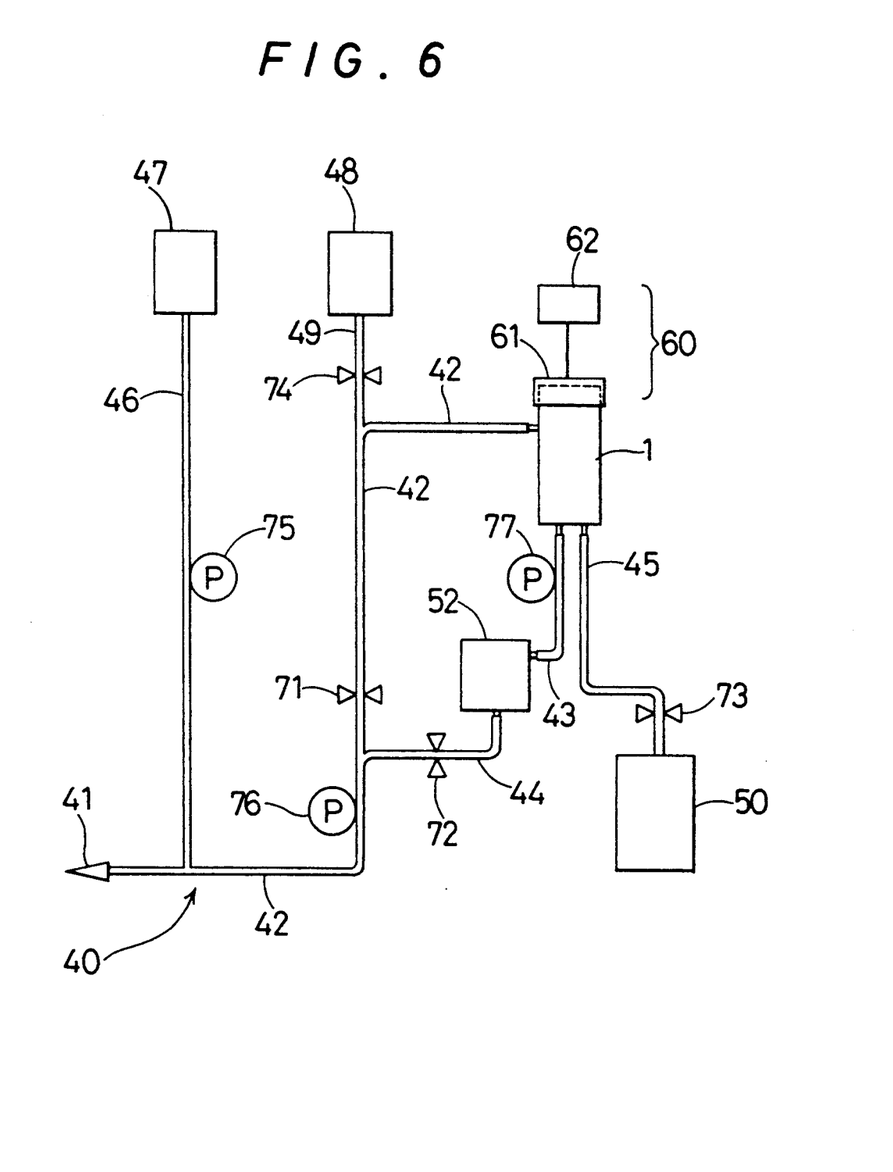
FIG. 6 is a plasma collecting system utilizing the plasma separating apparatus of the present invention.

FIG. 6 shows a plasma collecting circuit 40 utilizing the plasma separating apparatus of this invention.

The blood drawn from a vein of a donor via a needle 41 is bed into tube 42 by a pump 76. While the blood is flowing in the tube 42, an anticoagulant supplied from a anticoagulant container 47 and fed by a pump 75 through a tube 46 is added to the blood. The blood is then sent out from the pump 76 to the plasma separating apparatus 1 via the tube 42 and flows into the plasma separating apparatus 1 from the blood inlet port 5. In this stage of operation, clamps 72 and 74 are closed and clamps 71 and 73 are opened.

The plasma separating apparatus 1 is equipped with a drive means 60 for rotating the rotor 3. This drive means 60 comprises a drive member 61 and a drive motor 62 for rotating the drive member 61. When the drive member 61 is rotating driven by the rotation of the drive motor 62, the driving force is transmitted by permanent magnets disposed in the drive member 61 to the ferromagnetic elements 9 in the rotor 3 and the rotor 3 rotates. The blood fed in the plasma separating apparatus from the blood inlet port 5 enters the antechamber 20 and moves down into the plasma separating space 18. While the blood is flowing down in the plasma separating space 18, plasma in the blood is forced to pass through the plasma separating membrane 8 into the plasma passage 19 by the centrifugal shearing force generated by the rotation of the rotor 3 and flows out from the plasma outlet port 6. On the other hand, blood cells flow down in the plasma separating space 18 without passing the plasma separating membrane 8 and flow out from the blood cell outlet port 7. The plasma flown out from the plasma outlet port 6 enters a plasma collecting container 50 via a tube 45. The blood cells from the blood cell outlet port 7 flow into a blood storage container 52 via a tube 43 by a pump 77. The block 48 is a container of physiological saline solution. When a predetermined volume of blood cells has been stored in the blood storage container 52, the pumps 75 and 77 are stopped, the clamp 72 is opened and the other clamps are closed, and the pump 76 is operated in reverse to the direction for drawing blood to return the blood cells (packed red blood cells) to the donor.

The above blood drawing operation and blood return operation are repeated until a predetermined volume of plasma is collected in the plasma collecting container 50.

As described above, the plasma separating apparatus of the present invention comprises a housing having a blood inlet port, a plasma outlet port, a blood cell outlet port and plasma passage; a rotor rotatably held in the housing; a blood separating space formed between the outside surface of the rotor and the inside surface of the housing and communicating with the blood inlet port at its upper part and with the blood cell outlet port at its lower part; the plasma passage which encloses at least a part of the circumference of the blood separating space and communicates with the plasma outlet port; and a plasma separating membrane disposed so as to partition the blood separating space and the plasma passage. In this construction, plasma is forced to pass through the plasma separating membrane by a centrifugal shearing force generated by the rotation of the rotor and the separated plasma flows out through the plasma passage. Since the separated plasma does not flow out through the rotor, the rotor and the housing must not be sealed fluid-tight. The plasma passage can be disposed separately from the pivot mechanism. Thus, it is made possible to draw pure plasma with no risk of blood cells mixing in the separated plasma. Furthermore, since the rotor and the housing must not be sealed fluid-tight, the rotating resistance of the rotor is considerably decreased and hence the rotor can be rotated at a higher speed by a smaller driving force.

What is claimed is:

1. A plasma separating apparatus comprising:
a housing having a blood inlet port, a plasma outlet port, a blood cell outlet port, and a plasma passage;
said housing further including:
a substantially cylindrical inside housing surrounded by a substantially cylindrical outside housing; and
said inside housing having a plurality of plasma passage openings formed in a side wall thereof;
a rotor rotatably mounted in said inside housing:
a blood separating space formed between an outside surface of said rotor and an inside surface of said inside housing, said blood separating space being in fluid communication with said blood inlet port at an upper portion of said inside surface of said inside housing, said blood separating space being in fluid communication with said blood cell outlet port at a lower portion of said inside surface of said inside housing;
said plasma passage being formed between said inside housing and said outside housing, said plasma passage enclosing a circumference of said blood separating space, said plasma passage further being in fluid communication with said plasma outlet port at a lower portion of said outside housing;
a plasma separating membrane disposed in said inside housing for separating said blood separating space from said plasma passage, said plasma separating membrane being attached to a portion of a side wall of said inside housing so as to cover said plasma passage openings;
said outside housing further enclosing said portion of said side wall of said inside housing where said plasma separating membrane is attached to said inside housing;
said inside housing having first and second projections respectively provided substantially at a center of a top and bottom end portion of said inside housing;
said rotor having a closed top end portion and a closed bottom end portion;
said closed top end portion of said rotor having a first concavity provided substantially at a center of said closed top end portion of said rotor for receiving a tip end portion of said first projection; and
said closed bottom end portion of said rotor having a second concavity provided substantially at a center of said closed bottom end portion of said rotor for receiving a tip end portion of said second projection.

2. The plasma separating apparatus of claim 1, wherein said rotor has a substantially cylindrical shape, the apparatus further comprising:
first and second closing means for respectively closing a first and second end portion of said substantially cylindrical inside housing; and
wherein said closed top end portion and said closed bottom end portion of said rotor, respectively close a top and a bottom end portion of said substantially cylindrical shaped rotor, said rotor being rotatably held in said inside housing substantially at a center of each of said closed top end portion and said closed bottom end portion of said rotor by said first and second projections of said first and second closing means of said substantially cylindrical inside housing.

3. The plasma separating apparatus of claim 1, wherein said rotor includes a spiral concavity formed on said outside surface thereof for creating a turbulence in a fluid flowing adjacent to said rotor.

4. The plasma separating apparatus of claim 1, wherein a first part of said inside housing positioned at a blood inlet port of said inside housing, has a larger inner diameter than another part of said housing, said first part of said inside housing forming an annular blood inlet chamber.

5. The plasma separating apparatus of claim 1, wherein said inside housing has said blood inlet port disposed on an upper side wall portion thereof so as to be substantially parallel with a tangential line that is tangent to a side wall of said inside housing.

6. The plasma separating device of claim 1, wherein:
said tip end portions of said first and second projections are tapered such that a tip end of each of said first and second projections contacts and rotatably supports said rotor;
said tip ends of said first and second projections respectively having a smaller cross-sectional area than a cross-sectional area of said first and second tip end portions thereby reducing a frictional contact between said tip ends and said rotor.

7. The plasma separating apparatus of claim 1, wherein said rotor includes ferromagnetic elements therein for driving said rotor with a magnetic force that is induced in said rotor by an energy source provided outside said housing.

8. The plasma separating apparatus of claim 7, wherein said plasma separating membrane includes a porous membrane comprising cellulose esters of an organic acid.

9. The plasma separating apparatus of claim 8, wherein said porous membrane is formed of a cellulose ester of an organic acid selected from a group consisting of cellulose nitrate and cellulose acetate.

10. The plasma separating apparatus of claim 7, wherein said plasma separating membrane includes a porous membrane comprising a synthetic resin.

11. The plasma separating apparatus of claim 10, wherein the porous membrane is formed of a synthetic resin selected from the group consisting of polypropylene, polyethylene and polycarbonate.

* * * * *